(12) United States Patent
Puppin et al.

(10) Patent No.: US 6,788,023 B2
(45) Date of Patent: Sep. 7, 2004

(54) MOTOR STARTER CIRCUIT, PARTICULARLY FOR REFRIGERATOR COMPRESSORS

(75) Inventors: Ezio Puppin, Brugherio (IT); Ermanno Pinotti, Bergamo (IT)

(73) Assignee: Minu S.p.A., Busnago (IT)

( * ) Notice: Subject to any disclaimer, the term of this patent is extended or adjusted under 35 U.S.C. 154(b) by 5 days.

(21) Appl. No.: 10/101,152

(22) Filed: Mar. 20, 2002

(65) Prior Publication Data

US 2002/0140396 A1 Oct. 3, 2002

(30) Foreign Application Priority Data

Mar. 27, 2001 (IT) .................................. MI2001A0649

(51) Int. Cl.[7] .............................................. H02P 7/36
(52) U.S. Cl. .................. 318/778; 318/751; 318/753; 318/783; 318/784; 318/785; 318/786
(58) Field of Search ............................. 318/778, 751, 318/753, 783, 784, 785, 786, 254

(56) References Cited

U.S. PATENT DOCUMENTS

| | | | | |
|---|---|---|---|---|
| 3,872,363 A | * | 3/1975 | Gross ........................ 318/762 |
| 4,366,426 A | | 12/1982 | Turlej ........................ 318/786 |
| 4,399,394 A | | 8/1983 | Ballman ..................... 318/786 |
| 4,672,284 A | * | 6/1987 | Ward ......................... 318/752 |
| 4,761,601 A | | 8/1988 | Zaderej ...................... 318/786 |
| 4,806,838 A | * | 2/1989 | Weber ........................ 318/729 |
| 4,843,295 A | * | 6/1989 | Thompson et al. ......... 318/786 |
| 5,103,154 A | * | 4/1992 | Dropps et al. ............. 318/782 |
| 5,650,697 A | * | 7/1997 | Imagi et al. ............... 318/254 |
| 6,051,952 A | * | 4/2000 | Moreira et al. ............ 318/738 |

FOREIGN PATENT DOCUMENTS

| | | |
|---|---|---|
| EP | A-0 049 870 | 4/1982 |
| EP | A-0 319 404 | 6/1989 |
| EP | A-0 542 955 | 5/1993 |
| EP | A-1 045 510 | 10/2000 |
| GB | A-2 092 401 | 8/1982 |
| JP | A-2000 308380 | 11/2000 |

* cited by examiner

*Primary Examiner*—Rita Leykin
(74) *Attorney, Agent, or Firm*—Guido Modiano; Albert Josif; Daniel O'Byrne

(57) ABSTRACT

A starter circuit for motors, particularly for refrigerator compressors, comprising a starter device which is adapted to be connected to a starter winding and to a steady-state winding of an asynchronous motor, the windings being in turn connected to a power supply line, a capacitor being connected in parallel to the starter device; the starter circuit further comprises a resistive element which is adapted to be connected between the starter device and the capacitor, in order to limit a discharge current of the capacitor on the starter device.

53 Claims, 2 Drawing Sheets

MOTOR STARTER CIRCUIT, PARTICULARLY FOR REFRIGERATOR COMPRESSORS

BACKGROUND OF THE INVENTION

The present invention relates to a motor starter circuit, particularly for refrigerator compressors, having improved characteristics. More particularly, the invention relates to a starter circuit for asynchronous motors, particularly but not exclusively suitable for refrigerator compressor motors.

It is known that in a refrigerator the compressor is operated cyclically so as to pump the refrigerant in the coils of the refrigerator.

This activation of the compressor occurs when the internal temperature of the refrigerator rises above a preset threshold. Accordingly, a heat-sensitive element detects the internal temperature of the refrigerator and when said temperature rises above the set threshold it sends an activation signal to a compressor starter circuit.

The starter circuit comprises a starter device and a device for protecting the motor of the compressor.

The starter device is constituted by a heat-sensitive element in which the flow of current increases the temperature, and such temperature increase causes the element to behave like a resistor of very high value, thus preventing the flow of current through it in order to reach the starter winding of the compressor motor.

However, although the heat-sensitive element is effective from the point of view of intermittent activation of the single-phase asynchronous motor of the compressor, it has the drawback of entailing a continuous, albeit low, consumption of power throughout the operation of the motor.

U.S. Ser. No. 09/526,508 by the same Applicant discloses a starter circuit which overcomes the above-cited drawbacks.

In practice, the starter circuit according to the above-cited patent application comprises means for generating pulses which decrease over time and are adapted to drive switching means (for example a triac) which are connected to the motor of the compressor to be started; the pulse generation means are supplied with AC power.

The description of the above-cited patent application is assumed to be fully included herein by reference.

However, the solution proposed in the above-cited patent application, while being highly efficient from the point of view of current consumption, is affected by a drawback described hereafter.

Generally, a motor for refrigerator compressors is a motor of the asynchronous type in which there are two windings: a steady-state winding, which is permanently powered, and a starter winding, which must be powered for a short time only upon motor startup and must then be disconnected.

FIG. 1 is a schematic view of the principle of insertion of the starter device according to the above-cited patent application for the actuation of an asynchronous motor.

The reference numeral 1 designates the starter device according to the above-cited patent application; the reference numeral 2 designates the starter winding; and the reference numeral 3 designates the steady-state winding, which is connected to the phase line 4 and to the neutral line 5.

The operation of the circuit shown in FIG. 1 is as follows. When voltage is supplied to the line, the starter 1 closes the circuit, supplying power to the starter winding 2. After a preset time, the starter device 1 opens the switch that it contains (for example, as mentioned, a triac) and disengages the starter winding 2.

In order to improve the efficiency of the motor, some models of compressor have a capacitor 6, known as steady-state capacitor, shown in dashed lines in FIG. 1.

The steady-state capacitor 6 is parallel-connected to the starter device 1.

During starting, the capacitor 6 is charged periodically to significant voltages and discharges in very short times over the switch (triac) of the starter device 1. These discharge currents are very high and damage the triac irreparably.

The problem of the coexistence of the triac and the capacitor is universally known and occurs not only in the field of refrigerator compressors but in every field in which a triac is used and there is, in the vicinity, a capacitor whose discharge current can damage the triac.

Accordingly, the circuit shown in FIG. 1 has reliability problems caused by the presence of the capacitor 6 which discharges suddenly on the triac that is present in the starter device 1.

SUMMARY OF THE INVENTION

The aim of the present invention is to provide a starter circuit for motors, particularly for refrigerator compressors, in which the capacitor that is provided in parallel to the starting configuration has no negative effect, with its discharge, on the switch of the starter device.

Within this aim, an object of the present invention is to provide a starter circuit for motors, particularly for refrigerator compressors, in which the discharge current that arrives from the capacitor connected in parallel to the starter device is highly limited, so that it remains within acceptable limits and can be withstood by the switch of the starter device.

Another object of the present invention is to provide a starter circuit for motors, particularly for refrigerator compressors, in which the operation of the motor is not affected by the presence of the circuit according to the invention.

Another object of the present invention is to provide a starter circuit for motors, particularly for refrigerator compressors, which is highly reliable, relatively simple to manufacture and at competitive costs.

This aim and these and other objects which will become better apparent hereinafter are achieved by a starter circuit for motors, particularly for refrigerator compressors, comprising a starter device which is adapted to be connected to the starter winding and to the steady-state winding of an asynchronous motor, said windings being in turn connected to the power supply line, a capacitor being connected in parallel to said starter device, the starter circuit further comprising a resistive element which is adapted to be connected between said starter device and said capacitor, in order to limit the discharge current of said capacitor on said starter device.

BRIEF DESCRIPTION OF THE DRAWINGS

Further characteristics and advantages of the invention will become better apparent from the description of a preferred but not exclusive embodiment of the starter circuit according to the present invention, illustrated only by way of non-limitative example in the accompanying drawings, wherein.

DESCRIPTION OF THE PREFERRED EMBODIMENTS

Figure 1:
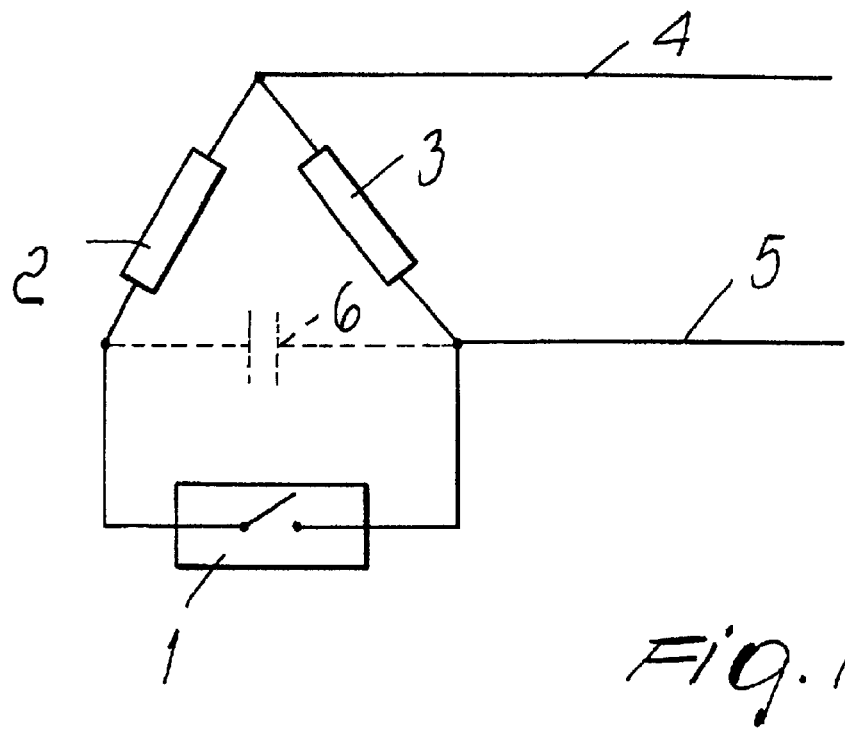
FIG. 1 is a circuit diagram of the connection of a conventional starter circuit to the windings of an asynchronous motor.
Figure 2:
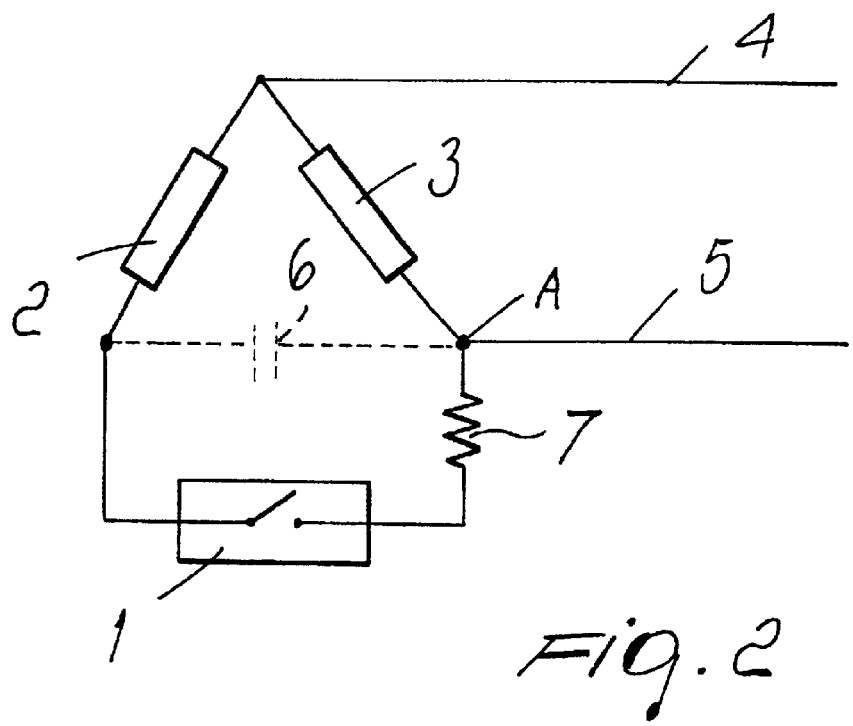
FIG. 2 is a circuit diagram, similar to FIG. 1, with a starter circuit according to the present invention inserted therein.

With reference to the figures, in which identical reference numerals designate identical elements, and particularly with reference to FIG. 2, the starter circuit according to the present invention, generally designated by the reference numeral 1 as in FIG. 1, is connected in parallel to the capacitor 6.

In order to prevent the sudden discharge of the capacitor 6, which is in turn connected to the starter winding 2 and to the steady-state winding 3 of the motor, from being able to damage the switch contained in the starter device 1, i.e., the triac (not shown in detail in the figure), the starter circuit according to the invention interposes, between the capacitor 6 and the starter device 1, a resistive element 7 which allows the discharge of the capacitor 6, thus preventing the discharge current that reaches the switch of the starter device from damaging the switch (triac).

Substantially, the resistive element 7 is connected between the starter device 1 and a node shared by a terminal of the capacitor 6, a terminal of the starter winding 3, and the neutral line.

The interposition of the resistive element 7, which can be for example an actual electronic component or can be provided for example by cutting from a template of appropriate size the metallic contacts or the very Faston connectors used to connect the starter device 1 to the motor, produces no appreciable effect on the operation of the motor, in view of its low ohmic value.

Conveniently, the ohmic value of the resistive element 7 might be for example between 1 and 5 ohm.

Power dissipation in the resistive element 7 can be rather high; however, since the motor starting phase lasts approximately 0.5 seconds, the heating of the resistive element 7 is negligible and it is not necessary to use high-wattage resistors.

Figure 3:
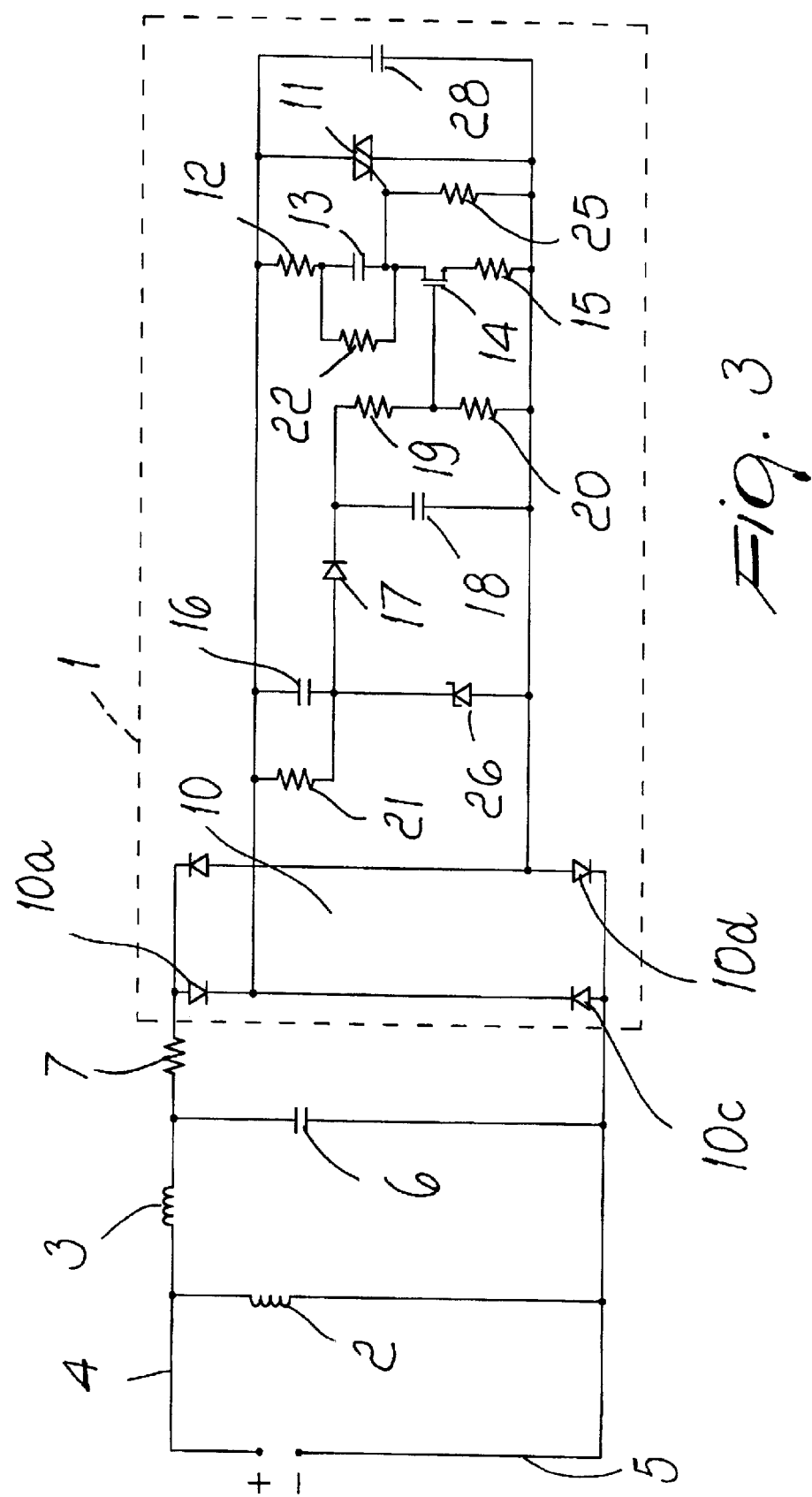
FIG. 3 is a circuit diagram of a second embodiment of the starter circuit according to the present invention.

FIG. 3 illustrates a second embodiment of the starter circuit according to the present invention. With reference to said figure, in which identical reference numerals designate identical elements, the starter device 1, connected to the steady-state winding 2 and to the starter winding 3, comprises a rectifier bridge 10 which is constituted by four diodes 10a–10d which are adapted to rectify the mains voltage and apply it to the terminals of a switching element 11 which can be conveniently constituted by a triac or by an SCR.

The gate terminal of the switching device 11 is supplied by the voltage rectified by the diode bridge 10, by means of a resistive-capacitive network formed by a resistor 12 and by a corresponding capacitor 13 arranged in series thereto. The resistor 12 and the capacitor 13 are further arranged in series to a transistor 14, conveniently of a bipolar or MOS type, whose source terminal is connected to a resistor 15 for thermal stabilization of the transistor. The resistor can optionally be eliminated.

The voltage rectified by the diode bridge 10 also supplies a capacitive divider constituted by a first capacitor 16, a diode 17 and a second capacitor 18, which is in turn parallel-connected to two resistors 19 and 20 adapted to constitute a resistive divider and to draw the voltage across the second capacitor 18.

The gate terminal of the transistor 14 is connected to the common node between the two resistors 19 and 20.

The first capacitor 16 has a resistor 21 connected in parallel thereto and the capacitor 13 arranged in series to the resistor 12 in turn has a resistor 22 connected in parallel.

With reference to the above-described circuit, operation is as follows.

During power-up, the resistors 21 and 22 can be ignored owing to their high ohmic value. These resistors become involved during power-down, which is described hereinafter.

The mains voltage supplies directly the steady-state winding 2, while the starter winding 3 is supplied by means of the circuit of the starter. The mains voltage is rectified by the diode bridge 10 and is applied to the terminals of the switching device 11. The same rectified voltage supplies, by means of the network 12 and 13, the gate terminal of the switching device 11.

The MOS transistor 14 is initially off and therefore the current that passes through the resistor 12 and the capacitor 13 initially partly enters the gate terminal of the switching device 11 and partly enters a temperature compensation resistor 25 which is parallel-connected to the MOS transistor 14.

The fraction of current that enters the gate terminal of the switching device, hereinafter termed triac for convenience, is sufficient to switch on the triac, which accordingly conducts. Therefore, from the initial step the starter winding 3 is supplied along the path formed by the diode 10a, the triac 11 and the diode 10d during the positive half-waves of the supply voltage, and through the diode 10c, the triac 11 and the diode 10b during the negative half-waves.

The voltage rectified by the diode bridge 10 also supplies the capacitive divider formed by the first capacitor 16, by the diode 17 and by the second capacitor 18. However, while the capacitor 16 charges and discharges, following the supply voltage, the diode 17 prevents the capacitor 18 from discharging. Therefore, at each half-wave the voltage across the capacitor 18 increases by a certain amount which depends on the values of the two capacitors (at the end, the voltage across the capacitor 18 is limited by a Zener diode 26 arranged in parallel to the capacitor 18).

The voltage across the second capacitor 18 is drawn from the resistive divider formed by the resistors 19 and 20 and supplies the gate terminal of the transistor 14.

During operation, as the voltage across the second capacitor 18 increases, the voltage applied to the gate terminal of the transistor 14 also increases, and the transistor 14 at a certain point starts to conduct. By conducting, the transistor 14 discharges the current of the network 12 and 13, which therefore no longer flows through the gate terminal of the triac 11 and is no longer able to switch it on.

From this moment onward, the path that supplies the starter winding 3 is interrupted and the winding is no longer powered. The resistor 15 on the source terminal of the transistor 14 is designed to provide thermal stabilization of the operation of the transistor, but as mentioned it may optionally be omitted.

During starting, the capacitor 13 is charged to the mains voltage rectified by the diode bridge 10 and is then discharged immediately across the triac 11 as soon as said triac starts to conduct. When instead the triac switches off, at the end of the starting step, the capacitor 13 is no longer able to discharge across it and charges almost instantaneously to the mains voltage. From this point onward, the voltage accumulated on the capacitor 13 opposes the mains voltage, preventing further flows of current across the network 12 and 13 and the gate terminal of the switching device or triac 11. When the circuit is off, the currents of the various branches are therefore extremely small and power consumption is almost zero.

The circuit of FIG. 3 can be provided or not with the capacitor 6 and with the corresponding resistor 7.

When the motor is disconnected from the power supply, the capacitors 16 and 13 discharge with a time constant of a few seconds, after which the circuit returns to the initial condition and is ready for a new start. In order to make this discharge reproducible and reliable, the resistors with high ohmic value, i.e., the resistors 21 and 22 respectively, are arranged in parallel to the capacitors.

Another capacitor 28 can be connected in parallel to the switching device 11, with a snubbing function, limiting the voltage transients across the triac, where they can lead to spurious switch-ons. The presence of the capacitor 28 depends on the model of the triac 11 and may even be unnecessary. Sometimes it is also possible to provide a low-value resistor in series to the capacitor 28.

The temperature-variable resistor 25 is designed to compensate for the variation of the characteristics of the switching device 11 as the temperature varies. Operation is as follows: as the temperature increases, the current of the gate terminal required to engage the device 11 decreases greatly; accordingly, at high temperature even the small current that arrives from the network 12 and 13 when the circuit is off might become sufficient to switch on the triac 11 again at unintended times. However, as the temperature rises, the resistor 25 reduces its resistivity and drains an increasingly large percentage of the current that arrives from the network 12 and 13.

In this manner, the current that enters the gate terminal of the triac 11 is increasingly small as the temperature rises, and remains always close to the critical trigger value. By choosing appropriately the value of the resistor 25 (and by combining a resistor 25 in series with an ordinary resistor) it is possible to compensate the circuit over its entire operating temperature range.

In practice it has been observed that the starter circuit according to the invention fully achieves the intended aim and objects, since it allows to avoid damage to the switch that is present in the starter device due to the discharge of the capacitor connected in parallel to the starter device.

Substantially, the presence of the resistive element connected between the starter device 1 and the capacitor allows to limit the discharge currents that arrive from the capacitor without producing any appreciable effect on the operation of the motor connected to the starting circuit according to the invention.

The circuit thus conceived is susceptible of numerous modifications and variations, all of which are within the scope of the inventive concept; all the details may further be replaced with other technically equivalent elements.

The disclosures in Italian Patent Application No. MI2001A000649, from which this application claims priority, are incorporated herein by reference.

What is claimed is:

1. A motor starter circuit for compressors of refrigerators, comprising a starter device, adapted to be connected to a starter winding and to a steady-state winding of an asynchronous motor, said windings being in turn connected to a power supply line, wherein said starter device comprises a rectifier bridge adapted to supply a switching device, a gate terminal of said switching device being supplied by means of a resistive-capacitive network, a capacitive divider supplied by said bridge, a voltage drawn across said capacitive divider being adapted to supply a transistor which is series-connected to said resistive-capacitive network, said starter winding being supplied until said transistor starts conducting, said switching device being switched off when said transistor switches on, and wherein said resistive-capacitive network comprises a resistor and a capacitor which are connected in series, said capacitor being provided with a discharge resistor connected in parallel thereto.

2. The starter circuit according to claim 1, wherein said capacitive divider comprises a first capacitor which is connected to a diode which is in turn connected to a second capacitor, said second capacitor being connected in parallel to a resistive divider adapted to supply said transistor.

3. The starter circuit according to claim 2, wherein said first capacitor has a resistor connected in parallel thereto.

4. The starter circuit according to claim 1, wherein said switching device is a triac.

5. The starter circuit according to claim 1, wherein said switching device is an SCR.

6. The starter circuit according to claim 1, wherein said transistor is a bipolar transistor.

7. The starter circuit according to claim 1, wherein said transistor is a MOS transistor.

8. The starter circuit according to claim 2, further comprising a Zener diode which is connected in parallel to said second capacitor.

9. The starter circuit according to claim 1, further comprising a temperature compensation resistor which is connected in parallel to said transistor.

10. The starter circuit according to claim 1, further comprising a stabilization resistor which is connected in series to said transistor.

11. The starter circuit according to claim 1, further comprising a capacitor which is connected in parallel to said switching device.

12. The starter circuit according to claim 1, further comprising a steady-state capacitor which is connected in parallel to said steady-state winding.

13. The starter circuit according to claim 12, further comprising a resistor which is connected between said steady-state capacitor and said rectifier bridge.

14. A motor starter circuit, (particularly) for compressors of refrigerators (and the like), comprising a starter device, adapted to be connected to a starter winding an to a steady-state winding of an asynchronous motor, said windings being in turn connected to a power supply line, wherein said starter device comprises a rectifier bridge adapted to supply a switching device, a gate terminal of said switching device being supplied by means of a resistive-capacitive network, a capacitive divider supplied by said bridge, a voltage drawn across said capacitive divider being adapted to supply a transistor which is series-connected to said resistive-capacitive network, said starter winding being supplied until said transistor starts conducting, said switching device being switched off when said transistor switches on, and wherein said capacitive divider comprises a first capacitor which is connected to a diode which is in turn connected to a second capacitor, said second capacitor being connected in parallel to a resistive divider adapted to supply said transistor.

15. The starter circuit according to claim 14, wherein said first capacitor has a resistor connected parallel thereto.

16. The starter circuit according to claim 14, wherein said resistive-capacitive network comprises a resistor and a capacitor which are connected in series, said capacitor being provided with a discharge resistor connected in parallel thereto.

17. The starter circuit according to claim 14, wherein said switching device is a triac.

18. The starter circuit according to claim 14, wherein said switching device is an SCR.

19. The starter circuit according to claim 14, wherein said transistor is a bipolar transistor.

20. The starter circuit according to claim 14, wherein said transistor is a MOS transistor.

21. The starter circuit according to claim 14, further comprising a Zener diode which is connected in parallel to said second capacitor.

22. The starter circuit according to claim 14, further comprising a temperature compensation resistor which is connected in parallel to said transistor.

23. The starter circuit according to claim 14, further comprising a stabilization resistor which is connected in series to said transistor.

24. The starter circuit according to claim 14, further comprising a capacitor which is connected in parallel to said switching device.

25. The starter circuit according to claim 14, further comprising a steady-state capacitor which is connected in parallel to said steady-state winding.

26. The starter circuit according to claim 19, further comprising a resistor which is connected between said steady-state capacitor and said rectifier bridge.

27. A motor starter circuit for compressors of refrigerators, comprising a starter device, adapted to be connected to a starter winding and to a steady-state winding of an asynchronous motor, said windings being in turn connected to a power supply line, wherein said starter device comprises a rectifier bridge adapted to supply a switching device, a gate terminal of said switching device being supplied by means of a resistive-capacitive network, a capacitive divider supplied by said bridge, a voltage drawn across said capacitive divider being adapted to supply a transistor which is series-connected to said resistive-capacitive network, said starter winding being supplied until said transistor starts conducting, said switching device being switched off when said transistor switches on, and further comprising a capacitor which is connected in parallel to said switching device.

28. The starter circuit according to claim 27, wherein said capacitive divider comprises a first capacitor which is connected to a diode which is in turn connected to a second capacitor, said second capacitor being connected in parallel to a resistive divider adapted to supply said transistor.

29. The starter circuit according to claim 28, wherein said first capacitor has a resistor connected parallel thereto.

30. The starter circuit according to claim 27, wherein said resistive-capacitive network comprises a resistor and a capacitor which are connected an series, said capacitor being provided with a discharge resistor connected in parallel thereto.

31. The starter circuit according to claim 27, wherein said switching device is a triac.

32. The starter circuit according to claim 27, wherein said switching device is an SCR.

33. The starter circuit according to claim 27, wherein said transistor is a bipolar transistor.

34. The starter circuit according to claim 27, wherein said transistor is a MOS transistor.

35. The starter circuit according claim 28, further comprising a Zener diode which is connected in parallel to said second capacitor.

36. The starter circuit according to claim 27, further comprising a temperature compensation resistor which is connected in parallel to said transistor.

37. The starter circuit according to claim 27, further comprising a stabilization resistor which is connected in series to said transistor.

38. The starter circuit according to claim 27, further comprising a steady-state capacitor which is connected in parallel to said steady-state winding.

39. The starter circuit according to claim 38, further comprising a resistor which is connected between said steady-state capacitor and said rectifier bridge.

40. A motor starter circuit for compressors of refrigerators, comprising a starter device, adapted to be connected to a starter winding and to a steady-state winding of an asynchronous motor, said windings being in turn connected to a power supply line, wherein said starter device comprises a rectifier bridge adapted to supply a switching device, a gate terminal of said switching device being supplied by means of a resistive-capacitive network, a capacitive divider supplied by said bridge, a voltage drawn across said capacitive divider being adapted to supply a transistor which is series-connected to said resistive-capacitive network, said starter winding being supplied until said transistor starts conducting, said switching device being switched off when said transistor switches on, and further comprising a steady-state capacitor which is connected in parallel to said steady-state winding.

41. The starter circuit according to claim 40, wherein said capacitive divider comprises a first capacitor which is connected to a diode which is in turn connected to a second capacitor, said second capacitor being connected in parallel to a resistive divider adapted to supply said transistor.

42. The starter circuit according to claim 41, wherein said first capacitor has a resistor connected in parallel thereto.

43. The starter circuit according to claim 40, wherein said resistive-capacitive network comprises a resistor and a capacitor which are connected in series, said capacitor being provided with a discharge resistor connected in parallel thereto.

44. The starter circuit according to claim 40, wherein said switching device is a triac.

45. The starter circuit according to claim 40, wherein said switching device is an SCR.

46. The starter circuit according to claim 40, wherein said transistor is a bipolar transistor.

47. The starter circuit according to claim 40, wherein said transistor is a MOS transistor.

48. The starter circuit according claim 41, further comprising a Zener diode which is connected in parallel to said second capacitor.

49. The starter circuit according to claim 40, further comprising a temperature compensation resistor which is connected in parallel to said transistor.

50. The starter circuit according to claim 40, further comprising a stabilization resistor which is connected in series to said transistor.

51. The starter circuit according to claim 40, further comprising a capacitor which is connected in series to said transistor steady-state capacitor which is connected in parallel to said steady-state winding.

52. The starter circuit according to claim 40, further comprising a resistor which is connected said steady-state capacitor and said rectifier bridge.

53. A motor starter circuit, (particularly) for compressors of refrigerators (and the like), comprising a starter device, adapted to be connected to a starter winding and a steady-state winding of an asynchronous motor, said windings being in turn connected to a power supply line, wherein said starter device comprises a rectifier bridge adapted to supply a switching device, a gate terminal of said switching device being supplied by means of a resistive-capacitive network, a capacitive divider supplied by said bridge, a voltage drawn across said capacitive divider being adapted to supply a transistor which is series-connected to said resistive-capacitive network, said starter winding being supplied until said transistor starts conducting, said switching device being switched off when said transistor switches on, further comprising a temperature compensation resistor which is connected in parallel to said transistor.

* * * * *